(12) United States Patent
Taibi et al.

(10) Patent No.: US 9,181,840 B2
(45) Date of Patent: Nov. 10, 2015

(54) METHOD TO OPERATE A DIESEL PARTICULATE FILTER

(75) Inventors: Cristian Taibi, Turin (IT); Alessia Tuninetti, Piemonte (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1161 days.

(21) Appl. No.: 13/176,779

(22) Filed: Jul. 6, 2011

(65) Prior Publication Data

US 2012/0011829 A1    Jan. 19, 2012

(30) Foreign Application Priority Data

Jul. 15, 2010    (GB) .................................. 1011900.6

(51) Int. Cl.
*F01N 3/00*    (2006.01)
*F01N 9/00*    (2006.01)
*F01N 3/10*    (2006.01)
(Continued)

(52) U.S. Cl.
CPC ................ *F01N 9/002* (2013.01); *F01N 3/103* (2013.01); *F02D 41/0055* (2013.01); *F02D 41/029* (2013.01); *F01N 2560/05* (2013.01); *F02D 41/1466* (2013.01); *F02D 41/1467* (2013.01);
(Continued)

(58) Field of Classification Search
CPC ..... F01N 3/103; F01N 9/002; F01N 2560/05; F02D 41/0055; F02D 41/029; F02D 2200/0812; F02D 41/1466; F02D 41/1467; F02D 41/2403; Y02T 10/47
USPC ............ 60/277, 297, 311; 73/114.69, 114.71, 73/114.75
See application file for complete search history.

(56) References Cited

U.S. PATENT DOCUMENTS 8,561,388 B2 * 10/2013 Yahata et al. .................... 60/277
2001/0013220 A1 * 8/2001 Schonauer ....................... 60/273
(Continued)

FOREIGN PATENT DOCUMENTS

CN    1629460 A    6/2005
CN    101089374 A    12/2007
(Continued)

OTHER PUBLICATIONS

Search Report issued in GB Application No. 1011900.6 dated Nov. 4, 2010.
(Continued)

*Primary Examiner* — Thomas Denion
*Assistant Examiner* — Matthew T Largi
(74) *Attorney, Agent, or Firm* — Ingrassia Fisher & Lorenz PC

(57) ABSTRACT

A method is provided to operate a diesel particulate filter of a Diesel engine equipped with a soot-sensor located in an outlet of the diesel particulate filter, the soot-sensor operating according to a succession of soot loading phases mutually separated by a regeneration phase. The method includes, but is not limited to setting a borderline value of the efficiency of the diesel particulate filter, resetting a value of a counter, during a regeneration phase of the soot-sensor, this value representing a soot loading level of the soot-sensor, iteratively increasing the value of this counter, during a next soot loading phase of the soot-sensor, at least until the value reaches a predetermined threshold value of the counter, and detecting an unsuited efficiency of the diesel particulate filter, if a next regeneration phase of the soot-sensor begins when the value of the counter is below the predetermined threshold value of the counter.

20 Claims, 3 Drawing Sheets

(51) Int. Cl.
  *F02D 41/00* (2006.01)
  *F02D 41/02* (2006.01)
  *F02D 41/14* (2006.01)
  *F02D 41/24* (2006.01)

(52) U.S. Cl.
  CPC ..... *F02D 41/2403* (2013.01); *F02D 2200/0812* (2013.01); *Y02T 10/47* (2013.01)

(56) References Cited

U.S. PATENT DOCUMENTS

| | | | |
|---|---|---|---|
| 2007/0089399 A1* | 4/2007 | Rhodes et al. | 60/278 |
| 2007/0125075 A1* | 6/2007 | Zanini-Fisher et al. | 60/297 |
| 2008/0000218 A1* | 1/2008 | Handler et al. | 60/273 |
| 2009/0008409 A1 | 1/2009 | Verhoeven et al. | |
| 2009/0301062 A1* | 12/2009 | Sumida et al. | 60/285 |
| 2011/0005198 A1* | 1/2011 | Ante et al. | 60/273 |

FOREIGN PATENT DOCUMENTS

| | | | | |
|---|---|---|---|---|
| DE | 10316810 A1 | | 11/2004 | |
| DE | 102009002602 A1 | * | 12/2009 | F01N 9/00 |
| EP | 1624166 A1 | * | 2/2006 | F01N 3/021 |
| JP | 200941456 A | | 2/2009 | |
| JP | 2009180216 A | | 8/2009 | |

OTHER PUBLICATIONS

Office Action issued Aug. 1, 2014 in Chinese Patent Application No. 201110198151.9.

* cited by examiner

METHOD TO OPERATE A DIESEL PARTICULATE FILTER

CROSS-REFERENCE TO RELATED APPLICATION

This application claims priority to British Patent Application No. 1011900.6, filed Jul. 15, 2010, which is incorporated herein by reference in its entirety.

TECHNICAL FIELD

The technical field relates to a method for operating a diesel particulate filter (DPF) belonging to a Diesel engine of a motor vehicle.

BACKGROUND

In order to reduce the polluting emission, the modern Diesel engine are conventionally equipped with a DPF, which is located in the exhaust pipe so as to retain the particulate matter (soot) contained in the exhaust gas. The operation of the DPF is characterized by its efficiency, which can be defined as the ratio of the quantity of soot retained in the DPF to the quantity of soot entering the DPF.

The current antipollution regulation does not provide any requirement about the DPF efficiency during the real road running of the motor vehicle, but only provides that the cumulative quantity of soot emitted by the motor vehicle during a test driving cycle is below a predetermined threshold. Nonetheless, it could be advisable for the On Board Diagnostic (OBD) of the motor vehicle to evaluate the DPF efficiency during a real road running, and to indicate to the driver if the DPF efficiency is below an admissible limit.

For this purpose, several studies have been already presented, which suggest evaluating the DPF efficiency by means of a soot-sensor located in the DPF outlet. As a matter of fact, these studies suggest to measure the soot concentration at the DPF outlet by means of said soot-sensor, to determine the soot concentration at the DPF inlet by means of an estimation or another soot-sensor, and to calculate the DPF efficiency as a function of these soot concentrations. However, these studies do not explain whether the above mentioned strategy can really provide a reliable DPF efficiency determination, since current in-development soot-sensors are not actually able to provide a continuous measurement of the soot concentration in the exhaust gas, but only a mean value of the soot concentration over a wide time range.

Current in-development soot sensors are conductometric sensors comprising a plurality of electrodes mutually separated on an insulating substrate provided for loading soot. As the soot is loaded on this substrate, an electrical current starts to flow between the electrodes of the soot-sensor and then gradually increases. When the current exceeds a predetermined threshold, the soot-sensor is subjected to a regeneration phase, during which the accumulated soot is burned off by means of a dedicated heater associated to the substrate, so as to get the soot-sensor ready for another soot loading phase. As a matter of fact, the operation of a soot-sensor is characterized by a continuous repetition of soot loading phases alternated by a regeneration phase.

A functional limit of this soot-sensor is that the electrical current generated during each soot loading phase becomes measurable only after a certain delay from the beginning of the soot loading, and then it rapidly increases with an exponential law. Due to this behavior, it is not possible to have a continuous measurement of the soot concentration in the exhaust gas. Conversely, it is possible to establish a reliable relationship between the soot concentration in the exhaust gas and the duration of the soot-loading phases, which is generally referred as time response of the soot-sensor.

However, it necessarily implies that the soot-sensor can only return a mean value of the soot concentration in the exhaust gas over a wide time range. As a consequence, the above mentioned strategy for determining the DPF efficiency is substantially unfeasible with the current in-development soot-sensors.

In view of the above, it is at least one object to provide a reliable strategy for evaluating the DPF efficiency during a real road running of the motor vehicle, using a soot-sensor located in the DPF outlet and overcoming the above mentioned drawbacks. At least another object is to reach this goal with a simple, rational and rather inexpensive solution. In addition, other objects, desirable features and characteristics will become apparent from the subsequent summary and detailed description, and the appended claims, taken in conjunction with the accompanying drawings and this background.

SUMMARY

An embodiment provides a method to operate a DPF of a Diesel engine. The Diesel engine is equipped with a soot-sensor located in a DPF outlet, and the soot-sensor operates according to a succession of soot loading phases mutually separated by a regeneration phase. The method according to the present embodiment of the invention comprises setting a borderline value of the DPF efficiency, resetting a value of a counter, during a regeneration phase of the soot-sensor, wherein this value represents a soot loading level of the soot-sensor, iteratively increasing the value of the counter during the next soot loading phase of the soot-sensor, at least until the value reaches a predetermined threshold value of the counter, so that the actual value of the counter expresses a soot loading level that the soot-sensor would reach, if the value of the DPF efficiency coincides with the borderline value of the DPF efficiency, and detecting an unsuited efficiency of the DPF, if a next regeneration phase of the soot-sensor begins when the value of the counter is below said predetermined threshold value of the counter.

Since the value of the counter is correlated to the borderline value of the DPF efficiency, three conditions may occur: the regeneration phase of the soot-sensor begins exactly when the value of the counter reaches its predetermined threshold, if the actual value of the DPF efficiency coincides with the borderline value; the regeneration phase of the soot-sensor begins after the value of the counter reaches its predetermined threshold, if the actual value of the DPF efficiency is greater than the borderline value; and the regeneration phase of the soot-sensor begins before the value of the counter reaches its predetermined threshold, if the actual value of the DPF efficiency is lower than the borderline value.

In view of the above, an embodiment provides a reliable strategy for evaluating whether the actual value of the DPF efficiency is below the borderline value or not. If an unsuitable DPF efficiency is detected this information can be stored by the electronic logic which performs the method, e.g., the ECU, on a suitable data carrier. Service personnel at a garage can derive this information at a later time and will then replace the DPF by a new DPF. Furthermore, detecting an unsuitable DPF efficiency can also be used to warn the driver, e.g., by emitting a light and/or sound signal for prompting him to replace the DPF.

According to an embodiment of the invention, the value of the counter is increased by the steps of determining a value of a soot concentration at a DPF inlet, determining an increment of the counter, on the basis of this value of the soot concentration at the DPF inlet, and on the basis of the borderline value of the DPF efficiency, adding this increment to a last determined value of the counter. This embodiment of the invention provides a reliable way to correlate the value of the counter to the borderline value of the DPF efficiency.

According to another embodiment, the value of the soot concentration at the DPF inlet can be estimated. Strategy for determining the soot concentration at the DPF inlet are already known and can be easily implemented in a method according to an embodiment, thereby avoiding additional cost. Alternatively, the value of soot concentration at the DPF inlet can be measured, for example by means of a soot-sensor located at the DPF inlet.

According to another embodiment, the increment of the counter can be determined by the steps of: determining a response time of the soot-sensor, on the basis of the value of the soot concentration at the DPF inlet, and on the basis of the borderline value of the DPF efficiency, calculating the increment of the counter as a function of this response time. By correlating the increment to the response time of the soot-sensor, this solution provides a robust counter that improves the reliability of the method according the present embodiment of the invention.

The response time can be determined by the step of: calculating a value of a soot concentration at the DPF outlet, as a function of the value of the soot concentration at the DPF inlet, and as a function of the borderline value of the DPF efficiency, and determining the response time, on the basis of this value of the soot concentration at the DPF outlet.

As stated in the preamble, the relationship correlating the response time of the soot-sensor and the soot concentration in the exhaust gas, has been already investigated and can be easily determined for the current soot-sensors. By way of example, this relationship can be empirically determined during an experimental activity performed on a test engine, which generally comprises the steps of monitoring the response time of the soot-sensor and measuring the soot concentration flowing through it with the aid of a proper sensor. This relationship can therefore be implemented in a calculation module, or used for generating a data set, capable to provide the response time of the soot-sensor on the basis of the value of a soot concentration at the DPF outlet. As a consequence, the last mentioned aspect of the invention allows simplifying the determination of the time response of the soot-sensor.

According to another embodiment, the increment of the counter is calculated as the reciprocal of the response time, and the threshold value of the counter is a unitary value. This solution provides a reliable criteria for determining whether the actual value of the DPF efficiency is below its borderline value or not. As a matter of fact, this criteria is analogous, from a theoretical point of view, to the criteria that is conventionally used for evaluating the fatigue life of a material.

According to still another embodiment, the borderline value of the DPF efficiency is determined during an experimental activity comprising the steps of setting a driving cycle for a motor vehicle equipped with the Diesel engine, the DPF and the soot-sensor in the DPF outlet, setting a threshold value of a cumulative quantity of soot that exits the DPF during the whole driving cycle, operating the motor vehicle according to the driving cycle, measuring an actual value of a cumulative quantity of soot that enters the DPF during the whole driving cycle, calculating the borderline value of the DPF efficiency as a function of the threshold value of the cumulative quantity of soot that exits the DPF, and as a function of the actual value of the cumulative quantity of soot that enters the DPF.

This solution provides reliable criteria for determining the borderline value of the DPF efficiency. In particular, the driving cycle and the threshold value of the cumulative quantity of soot that exits the DPF can be provided by an antipollution regulation. In this way, the method according to the embodiment can be used for detecting whether the motor vehicle complies with this antipollution regulation or not.

According to an embodiment, the method comprises the further step of detecting a suited efficiency of the DPF if the value of the counter reaches the predetermined threshold value, provided that the next regeneration phase of the soot-sensor has not yet started. In this way, it is advantageously possible to obtain the information that the DPF is properly working, without waiting for the soot-sensor to be subjected to the next regeneration phase, which generally takes a long time if the DPF is perfectly efficient.

The method according to the embodiments can be carried out with the help of a computer program comprising a program-code for carrying out all the steps of the method described above, and in the form of a computer program product comprising the computer program. The computer program product can be embodied as a Diesel engine equipped with a DPF, a soot-sensor located in the DPF outlet, an ECU connected to the soot-sensor, a data carrier associated to the ECU, and the computer program stored in the data carrier, so that, when the ECU executes the computer program, all the steps of the method described above are carried out. The method can be also embodied as an electromagnetic signal, said signal being modulated to carry a sequence of data bits which represent a computer program to carry out all steps of the method.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
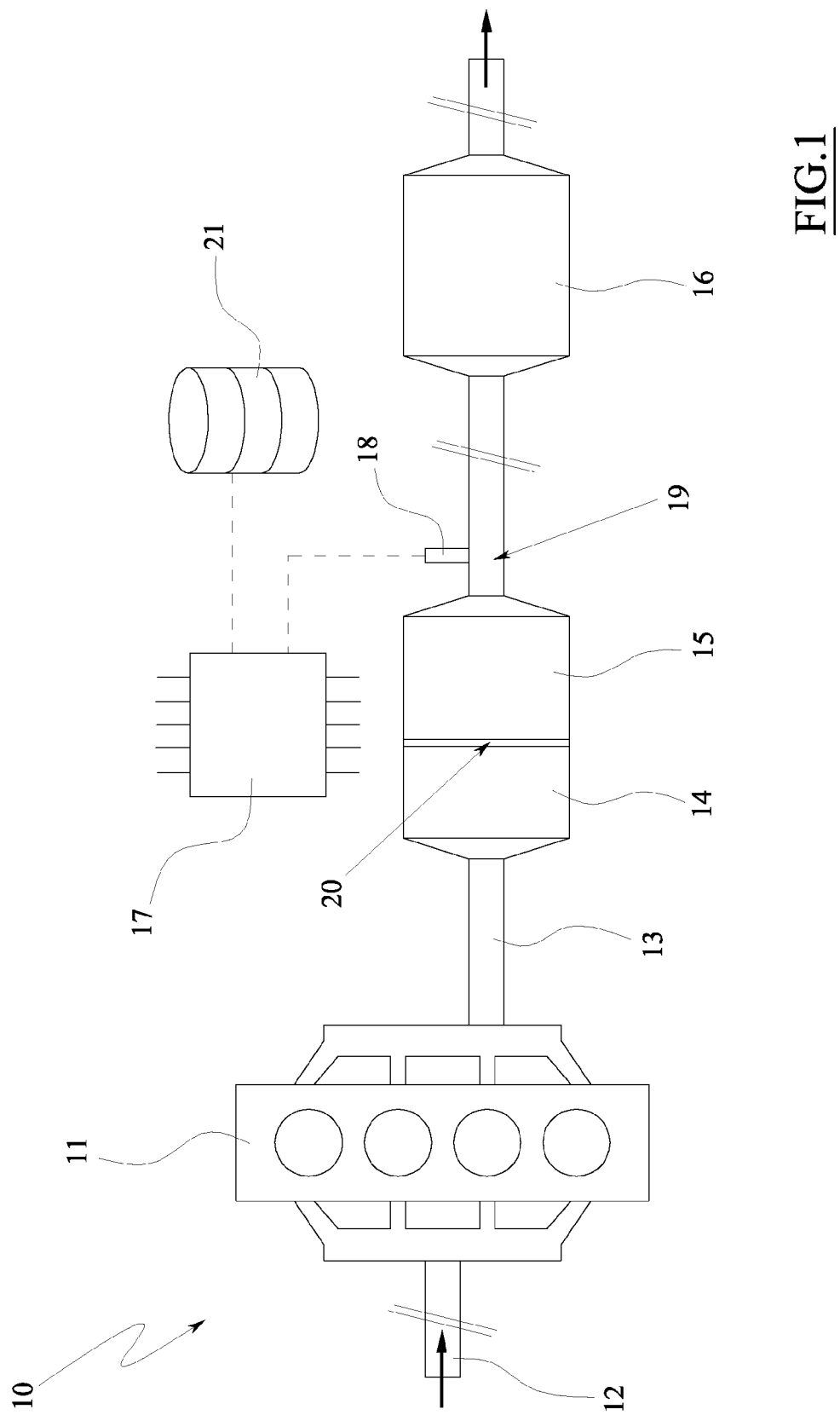
FIG. 1 is a schematic representation of an internal combustion engine system.

The following detailed description is merely exemplary in nature and is not intended to limit application and uses. Furthermore, there is no intention to be bound by any theory presented in the preceding background or summary or the following detailed description.

An embodiment is hereinafter disclosed with reference to an internal combustion engine system 10, which comprises a Diesel engine 11, an intake pipe 12 for feeding fresh air into the engine cylinders, an exhaust pipe 13 for discharging exhaust gas from the engine cylinders into the environment, and with a plurality of after treatment devices, which are located in the exhaust pipe 13, in order to degrade and/or remove pollutants from the exhaust gas before discharging it into the environment.

In greater details, the exhaust pipe 13 is provided with a Diesel Oxidation Catalyst (DOC) 14, for oxidizing hydrocarbon (HC) and carbon monoxides (CO) into carbon dioxide ($CO_2$) and water ($H_2O$); with a Diesel Particulate Filter (DPF) 15, which is located downstream the DOC 14, for removing diesel particulate matter (soot) from the exhaust gas; and with a conventional muffler 16 located downstream the DPF 15. The DOC 14 and the DPF 15 are closed coupled and contained in a single casing.

The internal combustion engine system 10 further comprises an Engine Control Unit (ECU) 17 that controls the operation of the Diesel engine 11 with the aid of a plurality of sensors. In particular, the ECU 17 is connected to a conductometric soot-sensor 18, which is located in the exhaust pipe 13, at the outlet 19 of the DPF 15, so as to measure the soot concentration in the exhaust gas exiting the DPF 15. During the operation of the Diesel engine 11, the soot-sensor 18 operates according to a succession of soot loading phases mutually separated by a regeneration phase.

During each soot loading phase, particulate matter (soot) gradually accumulates on a substrate of the soot-sensor 18, so as to generate an electrical current between a plurality of electrodes applied on that substrate. When the magnitude of the electrical current exceeds a given threshold, the accumulated particulate matter is burned off by an electrical heater associated to the substrate, thereby performing a regeneration phase of the soot-sensor 18. When the regeneration phase is completed, a new soot loading phase begins and so on.

The time period between two consecutive regeneration phases of the soot-sensor 18, that is the duration of the soot-loading phase between them, is generally referred as the response time of the soot-sensor 18. The response time of the soot-sensor 18 is correlated to the concentration of soot in the exhaust gas at the DPF outlet 19, according to a determinable relationship.

An embodiment provides a method for obtaining information about an efficiency of the DPF 15, during the normal operation of the Diesel engine 11. The efficiency of the DPF can be defined as the ratio of the quantity of soot retained in the DPF 15 to the quantity of soot entering the DPF 15.

Figure 2:
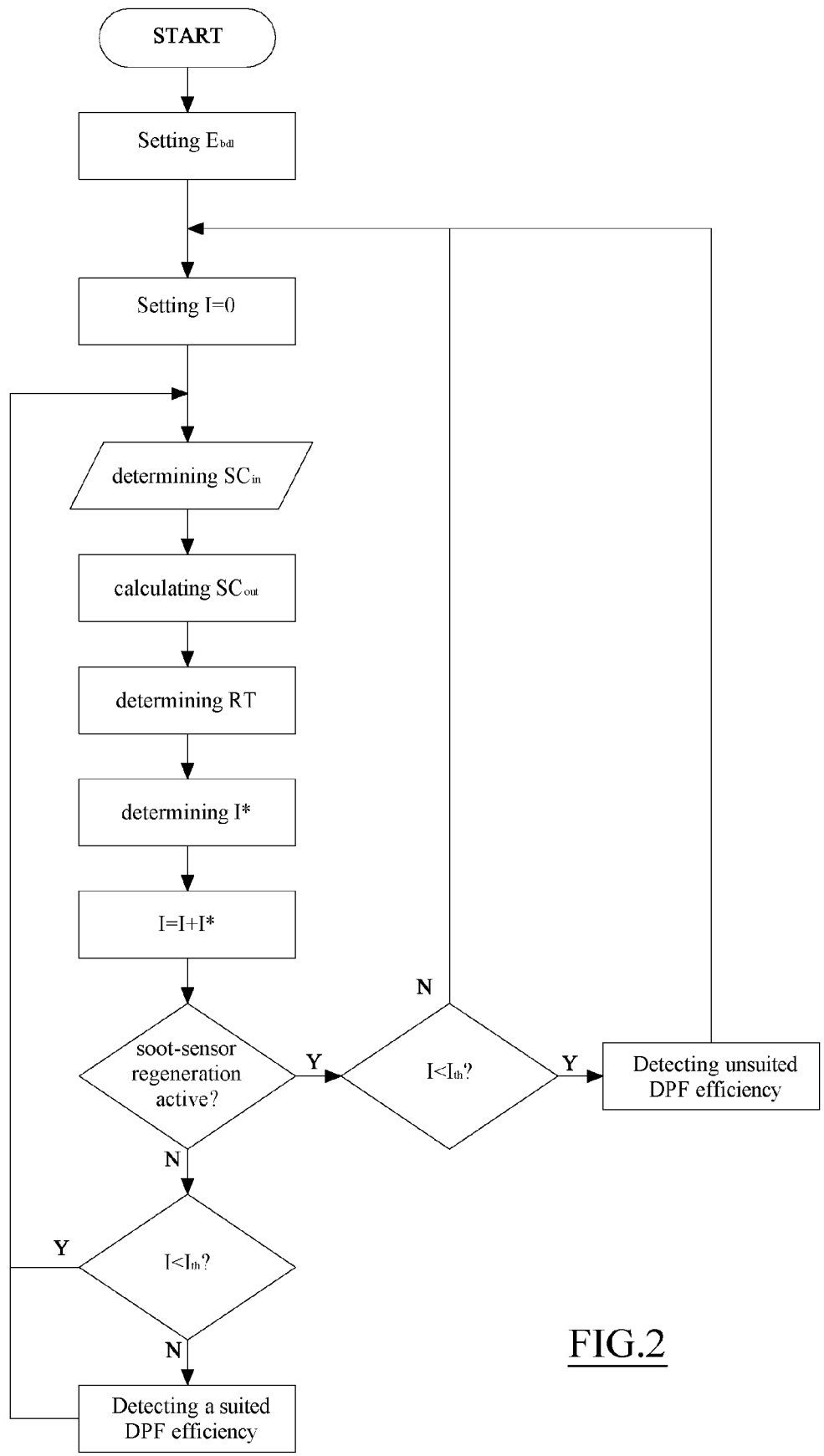
FIG. 2 is a flowchart representing a method according to an embodiment.
Figure 3:
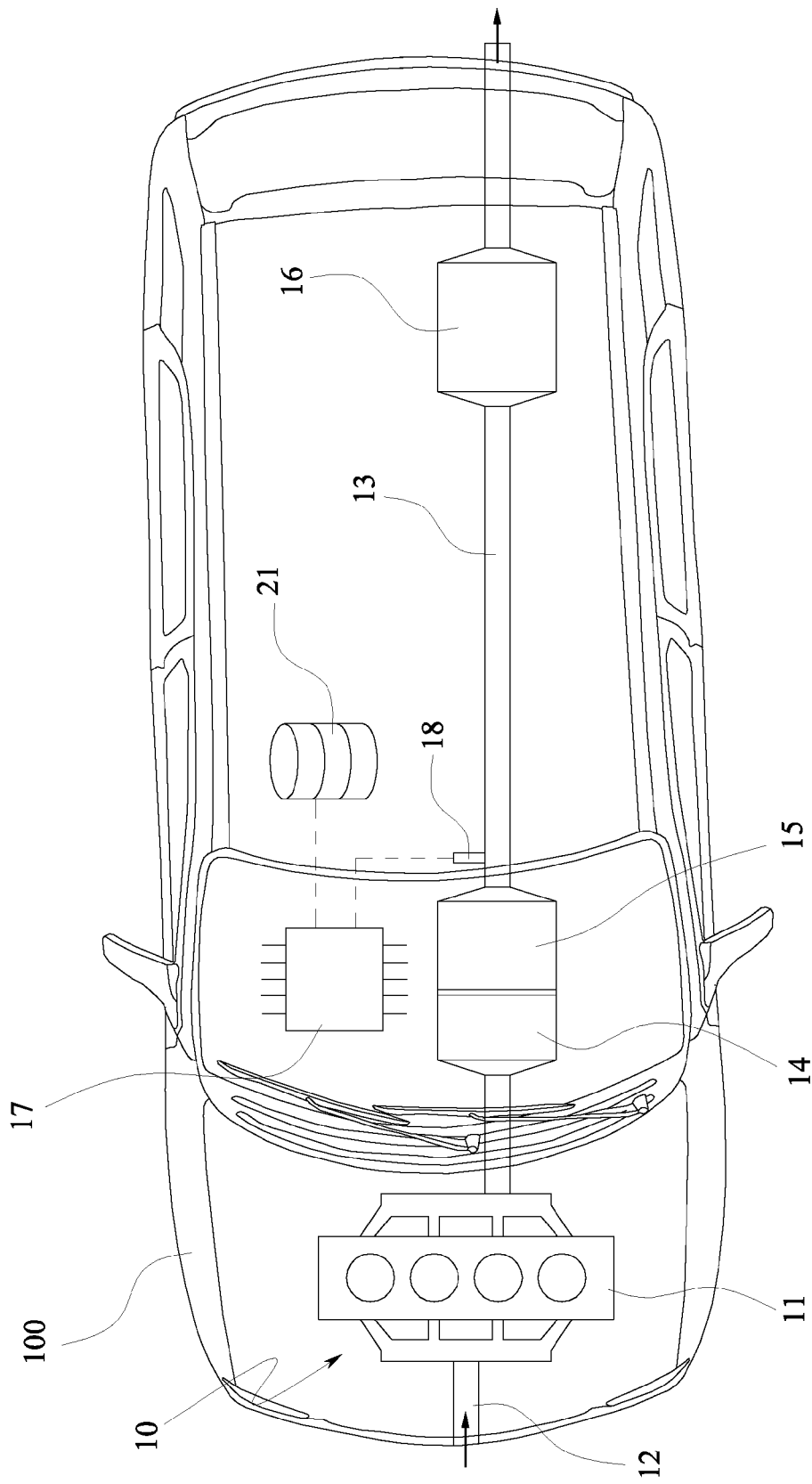
FIG. 3 is a schematic representation of a motor-vehicle equipped with the internal combustion engine system of FIG. 1.

As shown in FIG. 2, this method firstly provides for setting a borderline value Ebdl of the DPF efficiency. This borderline value Ebdl is determined during an experimental activity that is carried out on a test motor vehicle 100 equipped with the internal combustion engine system 10 (see FIG. 3). The experimental activity provides for setting a test driving cycle for the motor vehicle 100, and for setting a threshold value Qout,th of a cumulative quantity of soot that exits the DPF 15 during the whole test driving cycle.

The test driving cycle and the threshold value Qout,th can be established by a specific antipollution regulation, such as for example the OBD regulation. The experimental activity then provides for operating the motor vehicle 100 according to the test driving cycle, and for measuring an actual value Qin of a cumulative quantity of soot that enters the DPF 15 during the whole test driving cycle. At the end of this experimental activity, the borderline value Ebdl of the DPF efficiency can be calculated according to the following equation:

$$E_{bdl} = 1 - \frac{Q_{out,th}}{Q_{in}}.$$

Returning now to FIG. 2, the method provides for setting at zero a value I of a counter. Afterwards, the method provides for performing a routine that increases the value I of the above mentioned counter. This routine is set so that the value I of the counter expresses a soot loading level that the soot-sensor 18 would reach, if the actual value of the DPF efficiency coincides with the borderline value Ebdl of the DPF efficiency.

In greater detail, the routine firstly provides for determining a value SCin of the soot concentration in the exhaust gas flowing in the exhaust pipe 13, at the inlet 20 of the DPF 15. The value SCin is estimated by means of an estimating strategy that is per se known. Alternatively, the value SCin can be measured by means of an additional soot-sensor located at the DPF inlet 20. The routine then provides for calculating a value SCout of the soot concentration in the exhaust gas flowing in the exhaust pipe 13 at the DPF outlet 19.

The value SCout is calculated according to the following equation:

$$SC_{out} = SC_{in} \cdot E_{bdl}.$$

As a matter of fact, the value SCout represents the value of the soot concentration at the DPF outlet 19, which would be expected if the actual efficiency of the DPF 15 coincides with the borderline value Ebdl of the DPF efficiency. The value SCout is then used to determine a response time RT of the soot-sensor 18, which would expected if the soot concentration in the exhaust gas at the DPF outlet 19 coincides with the value SCout for a wide time range.

The response time RT can be determined by means of a map or a calculating module, in which the determinable relationship between the response time RT of the soot-sensor 18 and the soot concentration at the DPF outlet 19 is implemented. Afterwards, the routine provides for determining an increment I* of the counter.

The increment I* is calculated as a function of the previously determined response time RT, according to the following equation:

$$I^* = \frac{1}{RT}.$$

The increment I* is then added to the last determined value I of the counter, in order to obtain a new value I. At this point, the method provides for checking whether a regeneration phase of the soot-sensor 18 has started or not.

If soot-sensor 18 is subjected to a regeneration phase, the method provides for checking whether the current value I of the counter is below a predetermined threshold value Ith of the counter. In the present embodiment the threshold value Ith of the counter is equal to one. Since the current value I of the counter is calculated on the basis of the borderline value Ebdl of the DPF efficiency, if the regeneration phase of the soot-sensor 18 begins when the current value I is below the unitary threshold value Ith, it means that the actual efficiency of the DPF 15 is lower than the borderline value Ebdl, otherwise it means that the actual efficiency of the DPF 15 is greater or at least equal to the borderline value Ebdl. As a consequence, if the current value I of the counter is below the unitary threshold value Ith, the method provides for detecting an unsuited DPF efficiency.

Whether the current value I is below the unitary threshold value Ith or not, the method finally provides for resetting at zero the value I of the counter, so that all the steps previously described can be repeated during the subsequent soot loading phase of the soot-sensor 18. In case that the soot-sensor 18 is not subjected to a regeneration phase, namely while it is subjected to a soot loading phase, the method similarly provides for checking if the current value I of the counter is below the threshold value Ith.

In this case, if the current value I of the counter is equal or greater than the predetermined threshold value Ith of the counter, it means that the actual efficiency of the DPF 15 is certainly greater than the borderline value Ebdl. As a consequence, if the current value I of the counter is not below the threshold value Ith, the method provides for immediately detecting a suited DPF efficiency. Whether the current value I is below the unitary threshold value Ith or not, the method then provides for repeating the previously described routine, so as to gradually increase the value I of the counter, until a regeneration phase of the soot-sensor 18 begins. As a matter of fact, the routine can be repeated very often, for example once per second, in order to obtain an accurate value I of the counter.

This method for evaluating the DPF efficiency can be managed with the help of a computer program comprising a program-code for carrying out all the steps described above. The computer program is stored in a data carrier 21 associated to the ECU 17. In this way, when the ECU 17 executes the computer program, all the steps of the method described above are carried out.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the forgoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and in their legal equivalents.

What is claimed is:

1. A method to operate a diesel particulate filter of a Diesel engine equipped with a soot-sensor located in an outlet of the diesel particulate filter, the soot-sensor operating according to a succession of soot loading phases mutually separated by a regeneration phase, the method comprising:
    setting, by an engine control unit, a borderline value of an efficiency of the diesel particulate filter;
    resetting, by the engine control unit, a value of a counter during the regeneration phase of the soot-sensor that represents a soot loading level of the soot-sensor;
    iteratively increasing, by the engine control unit, the value of the counter during a next soot loading phase of the soot-sensor at least until the value reaches a predetermined threshold value of the counter; and
    detecting, by the engine control unit, an unsuited efficiency of the diesel particulate filter if a next regeneration phase of the soot-sensor begins when the value of the counter is below said predetermined threshold value of the counter.

2. The method according to claim 1, wherein the iteratively increasing the value of the counter comprises:
    determining, by the engine control unit, a value of a soot concentration at an inlet of the diesel particulate filter;
    determining, by the engine control unit, an increment of the counter on a basis of the value of the soot concentration at the inlet of the diesel particulate filter and on the basis of the borderline value of the efficiency of the diesel particulate filter; and
    adding, by the engine control unit, the increment to a last determined value of the counter.

3. The method according to claim 2, further comprising estimating, by the engine control unit, the value of the soot concentration at the inlet of the diesel particulate filter.

4. The method according to claim 2, further comprising measuring, by a soot-sensor located in an inlet of the diesel particulate filter, the value of the soot concentration at the inlet of the diesel particulate filter.

5. The method according to claim 2, the determining the increment of the counter comprises:
    determining, by the engine control unit, a response time of the soot-sensor on the basis of the value of the soot concentration at the inlet of the diesel particulate filter and on the basis of the borderline value of the efficiency of the diesel particulate filter; and
    calculating, by the engine control unit, the increment of the counter as a function of the response time.

6. The method according to claim 5, wherein the determining the response time comprises:
    calculating, by the engine control unit, a value of the soot concentration at the outlet of the diesel particulate filter as a function of the value of the soot concentration at the inlet of the diesel particulate filter and as a function of the borderline value of the efficiency of the diesel particulate filter; and
    determining, by the engine control unit, the response time, on the basis of this value of the soot concentration at the outlet of the diesel particulate filter.

7. The method according to claim 5,
    wherein the calculating the increment of the counter comprises calculating, by the engine control unit, the increment of the counter as a reciprocal of the response time, and
    wherein a threshold value of the counter is a unitary value.

8. The method according to claim 1, wherein determining the borderline value of the efficiency of the diesel particulate filter comprises determining the borderline value during an experimental activity comprising:
    setting a driving cycle for a motor vehicle equipped with the Diesel engine, the diesel particulate filter and the soot-sensor in the outlet of the diesel particulate filter;
    setting a threshold value of a cumulative quantity of soot that exits the diesel particulate filter during a whole driving cycle;
    operating the motor vehicle according to the driving cycle;
    measuring an actual value of the cumulative quantity of soot that enters the diesel particulate filter during the whole driving cycle; and
    calculating the borderline value of the efficiency of the diesel particulate filter as a function of the threshold value of the cumulative quantity of soot that exits the diesel particulate filter, and as a function of the actual value of the cumulative quantity of soot that enters the diesel particulate filter.

9. The method according to claim 8, further comprising providing the driving cycle and the threshold value of the cumulative quantity of soot that exits the diesel particulate filter with an antipollution regulation.

10. The method according to claim 1, further comprising detecting, by the engine control unit, a suited efficiency of the diesel particulate filter if the value of the counter reaches the predetermined threshold value, provided that the next regeneration phase of the soot-sensor has not yet started.

11. A non-transitory computer readable medium embodying a computer program product which, when executed by an engine control unit, cause the engine control unit to:
    operate a diesel particulate filter of a Diesel engine equipped with a soot-sensor located in an outlet of the diesel particulate filter, the soot-sensor operating according to a succession of soot loading phases mutually separated by a regeneration phase, by:

setting a borderline value of an efficiency of the diesel particulate filter;

resetting a value of a counter during the regeneration phase of the soot-sensor that represents a soot loading level of the soot-sensor;

iteratively increasing the value of the counter during a next soot loading phase of the soot-sensor at least until the value reaches a predetermined threshold value of the counter; and detecting an unsuited efficiency of the diesel particulate filter if a next regeneration phase of the soot-sensor begins when the value of the counter is below said predetermined threshold value of the counter.

12. The non-transitory computer readable medium embodying the computer program product according to claim 11, the iteratively increasing of the value of the counter comprises:

determining a value of a soot concentration at an inlet of the diesel particulate filter;

determining an increment of the counter on a basis of the value of the soot concentration at the inlet of the diesel particulate filter and on the basis of the borderline value of the efficiency of the diesel particulate filter; and adding the increment to a last determined value of the counter.

13. The non-transitory computer readable medium embodying the computer program product according to claim 12, which, when executed by an engine control unit, cause the engine control unit to estimate the value of the soot concentration at the inlet of the diesel particulate filter.

14. The non-transitory computer readable medium embodying the computer program product according to claim 12, which, when executed by an engine control unit, cause the engine control unit to measure the value of the soot concentration at the inlet of the diesel particulate filter via a soot-sensor located in an inlet of the diesel particulate filter.

15. The non-transitory computer readable medium embodying the computer program product according to claim 12 which, when executed by an engine control unit, cause the engine control unit to:

determine a response time of the soot-sensor on the basis of the value of the soot concentration at the inlet of the diesel particulate filter and on the basis of the borderline value of the efficiency of the diesel particulate filter; and calculate the increment of the counter as a function of the response time.

16. A Diesel engine, comprising:

a diesel particulate filter comprising an outlet;

a soot-sensor that is located in the outlet of the diesel particulate filter;

an engine control unit connected to the soot-sensor, the engine control unit configured to:

set a borderline value of an efficiency of the diesel particulate filter;

reset a value of a counter during a regeneration phase of the soot-sensor that represents a soot loading level of the soot-sensor;

iteratively increase the value of the counter during a next soot loading phase of the soot-sensor at least until the value reaches a predetermined threshold value of the counter; and detect an unsuited efficiency of the diesel particulate filter if a next regeneration phase of the soot-sensor begins when the value of the counter is below said predetermined threshold value of the counter.

17. The Diesel engine according to claim 16, the engine control unit is further configured to:

determine a value of a soot concentration at an inlet of the diesel particulate filter;

determine an increment of the counter on a basis of the value of the soot concentration at the inlet of the diesel particulate filter and on the basis of the borderline value of the efficiency of the diesel particulate filter; and add the increment to a last determined value of the counter.

18. The Diesel engine according to claim 17, the engine control unit is further configured to estimate the value of the soot concentration at the inlet of the diesel particulate filter.

19. The Diesel engine according to claim 17, the engine control unit is further configured to measure the value of the soot concentration at the inlet of the diesel particulate filter.

20. The Diesel engine according to claim 17, the engine control unit is further configured to:

determine a response time of the soot-sensor on the basis of the value of the soot concentration at the inlet of the diesel particulate filter and on the basis of the borderline value of the efficiency of the diesel particulate filter; and calculate the increment of the counter as a function of the response time.

* * * * *